Aug. 7, 1951  J. D. E. VENNING  2,563,200
AUTOMATIC RELIEF VALVE
Filed Oct. 29, 1945
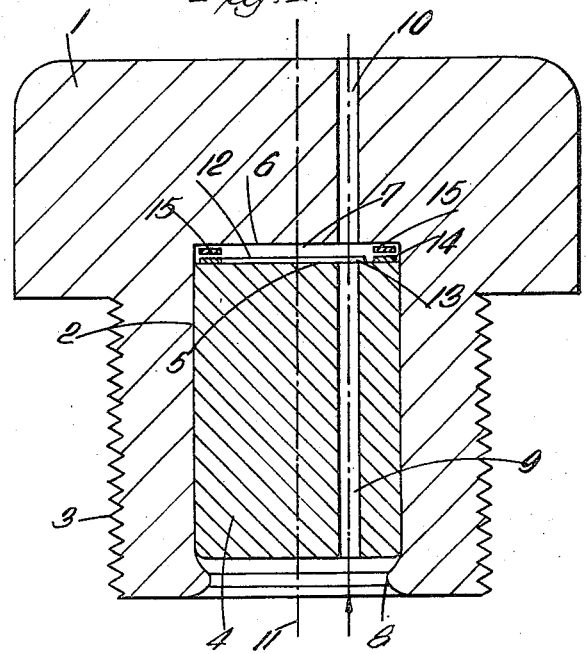
INVENTOR
JOHN DANIEL ELDRET
VENNING
BY
ATTORNEY Patented Aug. 7, 1951

2,563,200

UNITED STATES PATENT OFFICE 2,563,200

AUTOMATIC RELIEF VALVE

John Daniel Eldret Venning, Alton, England, assignor to John Venning & Company Limited, Alton, England, a British company Application October 29, 1945, Serial No. 625,314
In Great Britain December 22, 1944

7 Claims. (Cl. 251—118)

This invention relates to automatic relief valves and has for its object to provide an automatic relief valve which, whilst allowing unwanted gases to escape automatically from containers or pipes which contain or are to receive a liquid at or above atmospheric pressure, serves to retain the liquid in the container or pipe and prevents reentry of gas into the pipe or container.

According to the present invention an automatic relief valve is provided with a body, adapted to be connected to a container or pipe, in which are formed oppositely located ports between which is a chamber containing a valve normally seated against one port so as to close the same and arranged to be moved towards the other port so as to allow gas to escape and closing the other port when acted upon by a liquid.

The body may be in the form of a plug adapted to be screwed into a container or pipe.

The body is preferably provided with a recess for receiving a plug which is spaced from the end of the recess a sufficient distance to form a valve chamber, the body and plug having oppositely located ports therein.

The ports are preferably located eccentrically relative to the central axis of the body.

The valve is secured to a free end of a blade of thin resilient material, such as spring steel, the other end of the blade being fixed relative to the body. The free end of the blade may be enlarged to constitute the valve, or the valve may be a separate element fixed to the free end of the spring blade.

The valve may be anchored at one end by securing this end or forming this end integral with a ring which is held against one wall of the valve chamber by a washer bearing against the other wall of the valve chamber.

The invention will now be described by way of example with reference to the accompanying drawing, wherein:

Figure 1 is a sectional elevation of an automatic relief valve;

Figures 2 and 3 are partial sectional views showing a valve body in two different positions;

Figure 4 is a plan of a valve body;

Figure 5 shows the relief valve secured in a pipe; and Figure 6 shows a modification of a detail.

As shown in the drawing, a body 1 suitably shaped and constructed for attachment to a container or pipe which contains or is to receive a liquid, is provided with a recess 2, preferably of cylindrical shape.

The body 1 is shown in the form of a plug provided with an external screw thread 3 for engagement with a corresponding screw thread in the container or pipe.

The recess 2 is located in the end of the body adapted to be engaged with the container or pipe.

Into the recess 2 is fitted a plug 4 of corresponding shape, the end 5 of the plug 4 being spaced a sufficient distance from the inner end 6 of the recess 2 to form a valve chamber 7. The plug 4 may be secured in the recess 2 in any suitable manner, for example by swaging inwardly the end wall of the recess 2, as indicated at 8.

In the plug 4 and body 1 are formed registering axially aligned ports 9, 10 which extend parallel to the longitudinal axis 11 of the plug 4 and body 1. The ports 9, 10 are preferably eccentric to the axis 11. The port 9 is a pressure port and communicates with the container or pipe to which the relief valve is applied. The venting port 10 leads to the atmosphere.

In the valve chamber 7 is located a valve 13 (Figure 4) which is secured to the free end of a blade 12 formed preferably of thin resilient material, such as spring steel, hard bronze or other suitable material which is not liable to be attacked by a liquid or gas or air which the liquid may contain. The blade and valve 12, 13 operate in the manner of a reed and when the blade 12 is held or secured at one end the valve 13 and the free end of the blade are capable of being actuated by a gas or liquid under pressure and are returned to the normal position by the resilience of the blade when relieved of pressure.

The free end of the blade 12 is preferably enlarged to form valve 13 which is then capable of covering completely either of the ports 9 or 10 in the body 1 so as to prevent communication between the inside of the container and the atmosphere. The fixed end of blade 12, adapted to be held or secured, is preferably secured or formed integral with a ring 14, which on one side bears against the plug 4 (Figure 1), whilst a washer or ring 15 is located between the other side of the ring 14 and the body 1. The washer 15 may be of the same or greater thickness than the valve ring 14 and may be of the same or different material from the valve member 12.

Instead of using a washer 15, the body 1 may be provided with an annular shoulder bearing against the ring 14 of the valve member 13.

Suitable valve seats may be provided at the ends of the ports 9, 10 with which the valve 13 co-operates. The operation of a valve 12, 13 as above described is as follows:

The body 1 is preferably secured at the highest point of a container or pipe 16, which contains or is to contain a liquid, with air or other gas, under pressure. The air or gas rises to this high point, passes into the port 9 in plug 4, and lifts the valve 13 to a position intermediate the port seatings such as that shown in Figure 2, in which one edge only of the valve engages the seating of port 10. The air or gas then passes into the valve chamber 7 and escapes through the port 10 in the body 1. The force exerted on the valve 13 due to the flow of air or gas is insufficient to close the valve 13 against the port 10 in the body 1.

When all the air or gas has escaped, the liquid passes through the port 9 in the plug 4 and into the valve chamber 7. By reason of the pressure of the denser liquid, valve 13 is forced against the seating at the end of the port 10 in the body 1, as shown in Figure 3. Blade 12 is then distorted from its more uniform curved form, as shown in Figure 2, when acted upon by the flow of air or gas, thus preventing further flow of liquid through the port 10 in the body 1. When the pressure in the container or pipe is released the valve 13 immediately returns to its seat at the end of the port 9 in the plug 4 (Figure 1) and lies flat against this seat, thus preventing air returning into the chamber or pipe.

Instead of allowing the port 10 in the body 1 to vent directly into the atmosphere, it may do so through a pipe, vessel or the like.

As shown in Figure 6, the valve member may be in the form of a thick disc 17 which is mounted at one end of a blade or leaf spring 18 of which the other end is clamped between an annular projecting rim 19 and the bottom of the recess 2. The bottom of the recess 2 is also provided with a cavity 20 which, in conjunction with a cavity 21 in the inner end of the plug 4, forms a valve chamber for the valve member 17.

With a valve member 17 as shown in Figure 6 it is possible to provide ports 9, 10 of large cross-sectional area, whilst the relief valve may be used when high pressures occur without liability of damaging the valve member 17.

Instead of anchoring the end of the blade 18 in the manner described with reference to Figure 6, it may also be secured in position in the manner described with reference to Figure 1.

What I claim is:

1. An automatic venting relief valve for the purpose described, comprising a body having a valve chamber formed therein, a pressure port and an aligned venting port facing one another on opposite walls of said chamber, a valve seat formed at the end of each port, a spring blade having one end secured to the body and the other end free, and a valve carried by the free end of the spring blade and disposed for movement between said valve seats, the valve being adapted to occupy a first position in which the spring blade urges the valve resiliently into full engagement with the pressure port seat, a second position in which the blade so positions the valve that only the edge engages the venting port seat, and a third position in which the valve engages flat against and closes the venting port seat.

2. An automatic venting relief valve for the purpose described, comprising a body having a valve chamber formed therein, a pressure port and an aligned venting port facing one another on opposite walls of said chamber, a valve seat formed at the end of each port, a spring blade having one end secured to the body and the other end free, and a valve carried by the free end of the spring blade and disposed for movement between said valve seats, the valve being adapted to occupy a first position in which the spring blade urges the valve resiliently into full engagement with the pressure port seat when the pressure is low, a second position in which the blade so positions the valve that only the edge engages the venting port seat when air or gas is being vented, and a third position in which the valve completely abuts and closes the venting port seat when subjected to the pressure of the liquid.

3. An automatic venting relief valve for the purpose described, comprising a body having an axial recess therein, a cylindrical plug secured in said recess, the end of said plug being spaced from the closed end of said recess so as to form a valve chamber, a pressure port in the plug and an aligned venting port in the body facing one another on opposite walls of said chamber, a valve seat formed at the end of each port, a spring blade having one end secured to the body and the other end free, and a valve carried by the free end of the spring blade, the valve being adapted to occupy a first position in which the spring blade urges the valve resiliently into full engagement with the pressure port seat when the pressure is low, a second position in which the blade so positions the valve that only the edge engages the venting port seat when air or gas is being vented, and a third position in which the valve completely abuts and closes the venting port seat when subjected to the pressure of the liquid.

4. An automatic venting relief valve as claimed in claim 2, comprising an enlargement at the free end of the spring blade, said enlargement constituting the valve.

5. An automatic venting relief valve as claimed in claim 2, comprising a valve element separate from the spring blade, said valve element being rigidly secured to the free end of said spring blade.

6. An automatic venting relief valve as claimed in claim 3, comprising a ring bearing against one wall of the valve chamber, a washer located between the said ring and the other wall of the chamber, the fixed end of the spring blade being secured to the said ring, the spring blade extending diametrically across said ring.

7. An automatic venting valve for the purpose described comprising a body having a shallow valve chamber formed therein, a pressure port formed in said body and communicating with said valve chamber through the bottom wall of the latter, a venting port formed in said body and communicating with said valve chamber through the top wall of the latter, said pressure port and said venting port being axially aligned, a cantilever resilient blade having one end fixed relative to said bottom wall of said valve chamber and extending towards said ports, and a valve carried by the free end of said blade and constantly urged into sealing engagement with said pressure port, said valve being movable off said pressure port and into sealing engagement with said venting port.

JOHN DANIEL ELDRET VENNING.

REFERENCES CITED

The following references are of record in the file of this patent:

UNITED STATES PATENTS

| Number | Name | Date |
|---|---|---|
| 249,557 | Truesdell | Nov. 15, 1881 |
| 1,494,176 | Little | May 13, 1924 |
| 1,660,588 | Wishart | Feb. 28, 1928 |
| 1,694,626 | Roberts | Dec. 11, 1928 |
| 1,749,128 | Buss | Mar. 4, 1930 |
| 1,897,174 | MacLean | Feb. 14, 1933 |
| 2,120,852 | Bixler | June 14, 1938 |
| 2,217,380 | Peddler | Oct. 8, 1940 |
| 2,241,573 | Aschenbach | May 13, 1941 |